US007141137B2

(12) United States Patent
Fiutak et al.

(10) Patent No.: US 7,141,137 B2
(45) Date of Patent: Nov. 28, 2006

(54) METHOD OF MAKING LAMINATED WOOD BEAMS WITH VARYING LAMINATION THICKNESS THROUGHOUT THE THICKNESS OF THE BEAM

(75) Inventors: Jon C. Fiutak, Bangor, ME (US); Shane M. McDougall, Hampden, ME (US); Habib J. Dagher, Veazie, ME (US)

(73) Assignee: University of Maine System Board of Trustees, Bangor, ME (US)

( * ) Notice: Subject to any disclaimer, the term of this patent is extended or adjusted under 35 U.S.C. 154(b) by 294 days.

(21) Appl. No.: 10/377,009

(22) Filed: Feb. 28, 2003

(65) Prior Publication Data

US 2004/0071914 A1 Apr. 15, 2004

Related U.S. Application Data

(60) Provisional application No. 60/394,814, filed on Jul. 10, 2002.

(51) Int. Cl.
*B32B 37/12* (2006.01)

(52) U.S. Cl. ...................... 156/299; 156/300; 144/146; 144/346; 144/348; 144/351; 144/352; 428/106; 428/212; 428/213; 428/214; 428/215; 428/216

(58) Field of Classification Search ................ 156/160, 156/163, 299, 300; 428/106, 114, 105, 109, 428/156, 212; 52/729.1, 729.4, 729.2; 144/346, 144/358, 352, 146, 105, 351, 350, 348; 159/299
See application file for complete search history.

(56) References Cited

U.S. PATENT DOCUMENTS 4,239,071 A * 12/1980 Ritchie ...................... 144/365
4,965,973 A 10/1990 Engebretsen
5,002,105 A 3/1991 Bodig
5,026,593 A * 6/1991 O'Brien ...................... 428/215
5,074,092 A * 12/1991 Norlander .................... 52/455
5,362,545 A 11/1994 Tingley (Continued)

FOREIGN PATENT DOCUMENTS

CH 663 980 A5 1/1988

(Continued)

OTHER PUBLICATIONS

Falk, Robert H., Laminating Effects in Glued-Laminated Timber Beams, Journal of Structural Engineering, Dec. 1995, pp. 1857-1863.

(Continued)

*Primary Examiner*—Justin Fischer
*Assistant Examiner*—Christopher T. Schatz
(74) *Attorney, Agent, or Firm*—MacMillan, Sobanski & Todd, LLC

(57) ABSTRACT

A method of forming a laminated beam includes assembling a plurality of individual wood laminations in a juxtaposed relationship, and joining the assembled laminations together to form a laminated beam. The assembled laminations define a tension zone of individual wood laminations, a core zone of individual wood laminations, and an compression zone of individual wood laminations. The average thickness of the laminations in the tension zone is less than the average thickness of the laminations in the core zone, and the average thickness of the laminations in the compression zone is less than the average thickness of the laminations in the core zone.

21 Claims, 6 Drawing Sheets

U.S. PATENT DOCUMENTS

| | | | | |
|---|---|---|---|---|
| 5,565,257 | A | 10/1996 | Tingley | |
| 5,641,553 | A * | 6/1997 | Tingley | 428/114 |
| 5,725,929 | A * | 3/1998 | Cooke et al. | 428/106 |
| 6,037,049 | A * | 3/2000 | Tingley | 428/299.1 |
| 6,050,047 | A | 4/2000 | Covelli et al. | |
| 6,105,321 | A * | 8/2000 | KarisAllen et al. | 52/223.8 |
| 6,224,704 | B1 | 5/2001 | Bassett et al. | |
| 6,281,148 | B1 | 8/2001 | Dagher et al. | |
| 6,497,937 | B1 * | 12/2002 | Lam et al. | 428/106 |

FOREIGN PATENT DOCUMENTS

| | | | |
|---|---|---|---|
| EP | 1 199 139 | A1 | 4/2002 |

OTHER PUBLICATIONS

Neuvonen, Erja, et al., LVL, Laminated Veneer Lumber, an Overview of the Product, Manufacturing and Market Situation, on the Internet at Http://www.hochstrate.de/micha/reports/replvl.html, dated Jan. 30, 2003.

Saerrano, Erik et al., Numerical Investigations of the Laminating Effect in Laminated Beams, Journal of Structural Engineering, Jul. 1999, pp. 740-745.

Vick, Charles B, Adhesive Bonding of Wood Materials, Chapter 9.

Acceptance Criteria for Structural Composite Lumber, AC47, effective Aug. 2002, ICBO Evaluation Service, Inc., 2002.

* cited by examiner

METHOD OF MAKING LAMINATED WOOD BEAMS WITH VARYING LAMINATION THICKNESS THROUGHOUT THE THICKNESS OF THE BEAM

RELATED APPLICATIONS

This application claims priority from U.S. Provisional Patent Application Ser. No. 60/394,814, filed Jul. 10, 2002, and entitled LAMINATED WOOD BEAMS WITH VARYING LAMINATION THICKNESS THROUGHOUT THE THICKNESS OF THE BEAM.

TECHNICAL FIELD

This invention relates to a method of forming laminated wood beams. More particularly, the invention pertains to a method of forming laminated wood beams with varying lamination thickness throughout the vertical height of the beam.

BACKGROUND OF THE INVENTION

Laminated timber beams are used in a variety of structural and architectural applications, including residential, commercial, and industrial construction applications. The use of glued-laminated timbers (glulam), which are typically comprised of finger-jointed and face-bonded dimension lumber laminations, provides a multitude of advantages over conventional solid wood timbers for such applications. One such advantage is the ability to produce thicker, wider, and longer structural members, since the dimensions of the original lumber source do not limit the size and shape of the glulam laminations. Another such advantage of glulam beams is that by creating a beam of layered solid sawn or composite wood products, individual strength reducing defects are randomized throughout the beam volume, resulting in an increase in the overall strength of the glulam beam.

Wood laminations are typically graded visually based upon knot dimensions, grain angle deviations or other defects. Wood laminations are also graded mechanically to determine the modulus of elasticity as a measure of bending strength and stiffness. The traditional cross-sectional configuration of a glulam beam is comprised of a uniform series of laminations of equal thickness. It is known that the overall structural strength of the beam can be improved by placing higher-grade wood laminations in the compression and tension regions of the beam where the tensile and compressive stresses on the beam are highest. This traditional glulam composition meets or exceeds the strength of the solid timber counterparts, with the added advantage of being an efficient and conservation-conscious use of the wood resource.

In recent years, there has been increasing pressure on the lumber industry based upon the scarcity of the high-grade wood resource. This has made it more difficult and more costly to acquire the high-grade tension laminations needed to maintain competitive strength and stiffness design properties of traditional glulam beams. A recent solution to this problem has been the use of fiber-reinforced polymer panels at the extreme compression layer and the tension layer of the beam. More recently, another approach has been to use laminated veneer lumber (LVL) rather than solid-sawn lumber at the extreme compression and tension layers of the beam. The LVL laminate is a fabricated lamination of wood veneer layers, and functions as a replacement for the high-grade laminations. Such products have served as equivalents from a performance standpoint and address the scarcity of high-grade wood materials. However, these alternative beam designs to the conventional glulam beams are expensive to manufacture and raise consumption issues of alternate scarce resources, such as petroleum. Thus, it would be advantageous to develop a laminated beam that significantly improves glued-laminated timber beam performance, or reduces manufacturing cost, without relying on a large percentage of higher-grade wood laminations or fabricated wood lamination alternatives. Preferably, such a laminated beam would achieve substantially the same or superior performance results achieved by conventional glulam beams.

SUMMARY OF THE INVENTION

This invention achieves superior results by using lamination thickness as a variable to optimize beam strength. According to this invention there is provided a method of forming a laminated beam including assembling a plurality of individual wood laminations in a juxtaposed relationship, and joining the assembled laminations together to form a laminated beam. The assembled laminations define a tension zone of individual wood laminations, a core zone of individual wood laminations, and an compression zone of individual wood laminations. The average thickness of the laminations in the tension zone is less than the average thickness of the laminations in the core zone, and the average thickness of the laminations in the compression zone is less than the average thickness of the laminations in the core zone.

According to this invention there is also provided a method of forming a laminated beam including assembling a plurality of individual wood laminations in a juxtaposed relationship, and joining the assembled laminations together to form a laminated beam. Each of the individual wood laminations is an independent, unbound element within the assembly prior to the joining process. The assembled laminations define a tension zone of individual wood laminations and a remainder zone of individual wood laminations. The average thickness of the laminations in the tension zone is less than the average thickness of the laminations in the remainder zone.

According to this invention there is also provided a method of forming a laminated beam including assembling a plurality of individual kerf-sawn wood laminations in a juxtaposed relationship, and joining the assembled laminations together to form a laminated beam. The assembled laminations define a tension zone of individual kerf-sawn wood laminations and a remainder zone of individual kerf-sawn wood laminations. The average thickness of the laminations in the tension zone is less than the average thickness of the laminations in the remainder zone.

According to this invention there is also provided a method of forming a laminated beam including assembling a plurality of individual wood laminations in a juxtaposed relationship, and joining the assembled laminations together to form a laminated beam. The assembled laminations define a tension zone of individual wood laminations and a remainder zone of individual wood laminations. The assembled laminations in the tension zone comprise an inner tension zone having a plurality of laminations with an average uniform thickness and a outer tension zone having a plurality of laminations with an average uniform thickness, where the average thickness of the laminations in the outer tension zone is less than the average thickness of the laminations in the inner tension zone, and where the average thickness of the laminations in the inner tension zone is less than the average thickness of the laminations in the remainder zone.

According to this invention there is also provided a method of forming a laminated beam including assembling a plurality of individual wood laminations in a juxtaposed relationship, and joining the assembled laminations together to form a laminated beam. The assembled laminations define a tension zone of individual wood laminations and a remainder zone of individual wood laminations. The assembled laminations in the tension zone are comprised of an inner tension zone having a plurality of laminations with an average uniform thickness and an outer tension zone having a plurality of laminations with an average uniform thickness. The average thickness of the laminations in the outer tension zone is less than the average thickness of the laminations in the inner tension zone. The average thickness of the laminations in the inner tension zone and outer tension zone is determined by:

calculating a thickness ratio of the lamination thickness of the individual laminations in the inner tension zone to the lamination thickness of the individual laminations in the outer tension zone;

determining the square root of the thickness ratio;

calculating a distance ratio of the distance from an outer end of the inner tension zone to a neutral axis of the laminated beam and an outer end of the outer tension zone to a neutral axis of the laminated beam;

adjusting the individual lamination thickness of the laminations in the inner tension zone and the individual lamination thickness of the laminations in the outer tension zone such that the square root of the thickness ratio is inversely proportional to the distance ratio;

calculating a stress ratio of an allowable tensile stress of the individual laminations of the inner tension zone and an allowable tensile stress of the individual laminations of the outer tension zone, wherein the same lamination thickness is used in determining the allowable tensile stress in the inner tension zone and the outer tension zone; and adjusting the individual lamination thickness of the laminations in the inner tension zone and the individual lamination thickness of the laminations in the outer tension zone such that the square root of the tension ratio is approximately directly proportional to the stress ratio.

Various objects and advantages of this invention will become apparent to those skilled in the art from the following detailed description of the preferred embodiments, when read in light of the accompanying drawings.

DETAILED DESCRIPTION OF THE INVENTION

Figure 2:
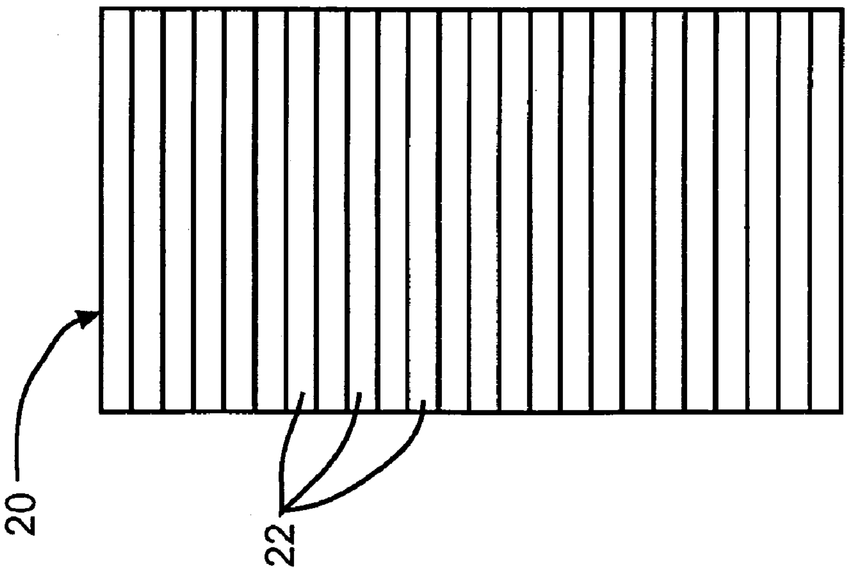
FIG. 2 Prior Art
FIG. 2 is a sectional elevational view of a traditional laminated timber beam shown in the prior art.

Referring now to the drawings, FIG. 2 illustrates a traditional glulam composite beam, indicated generally at 20. The conventional glulam beam 20 is comprised of uniform thickness laminations 22 throughout the vertical height of the glulam beam. Variations in bending and strength characteristics to accommodate stresses placed upon the glulam beam 20 are achieved by varying the grade or quality of material used in the uniform thickness laminations 22.

Figure 1:
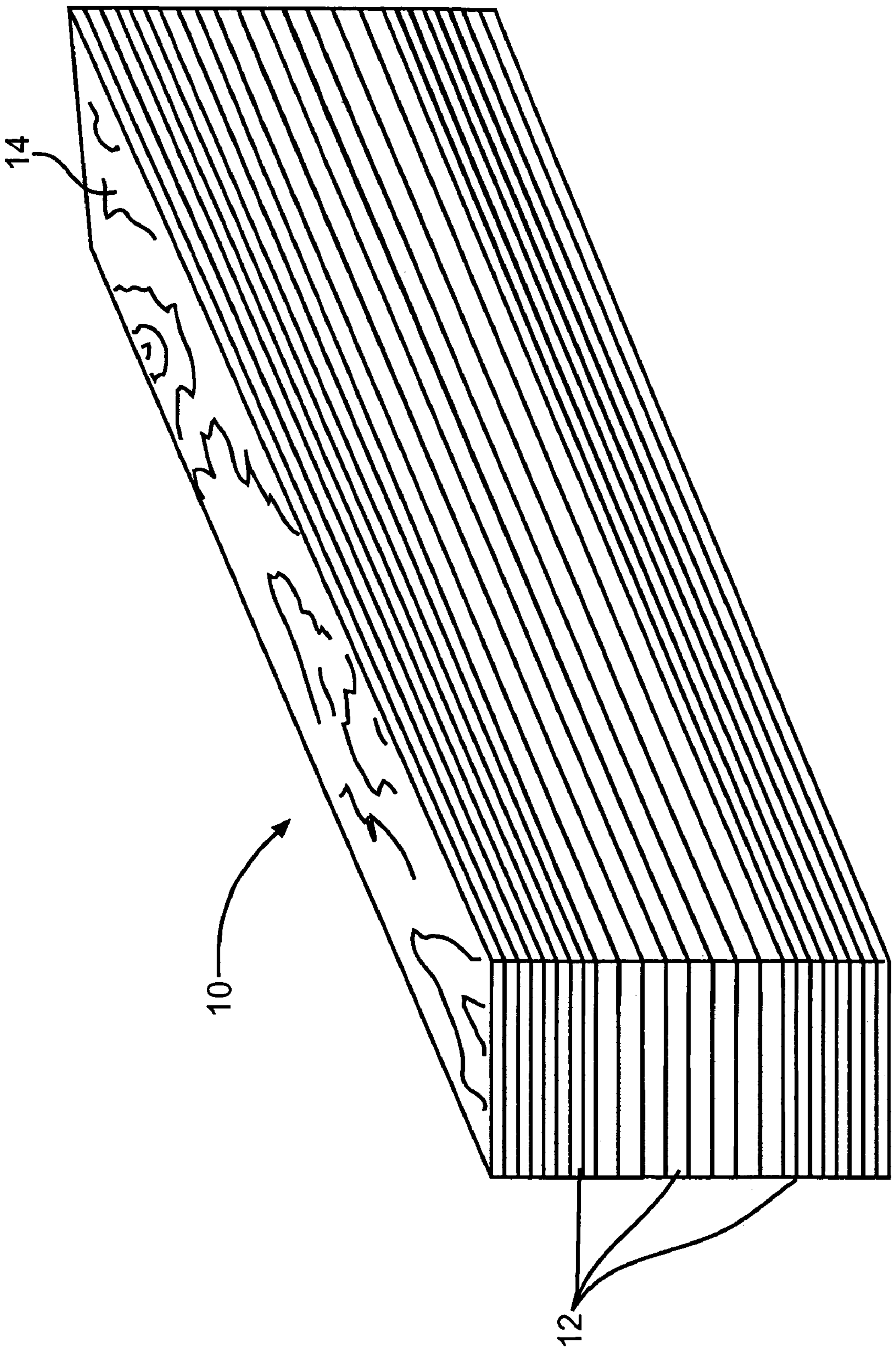
FIG. 1 is perspective view of a laminated timber beam in accordance with this invention.
Figure 4:
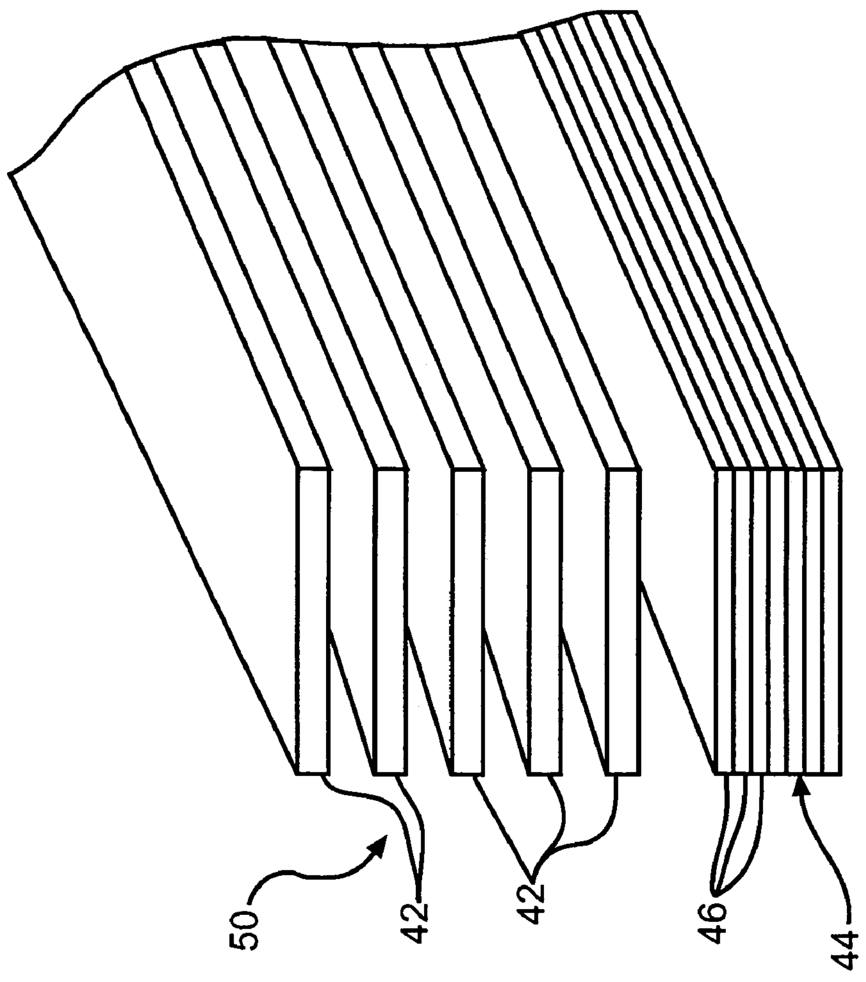
FIG. 4 is an exploded perspective view of another preferred method of assembly for a laminated timber beam in accordance with this invention.
Figure 6:
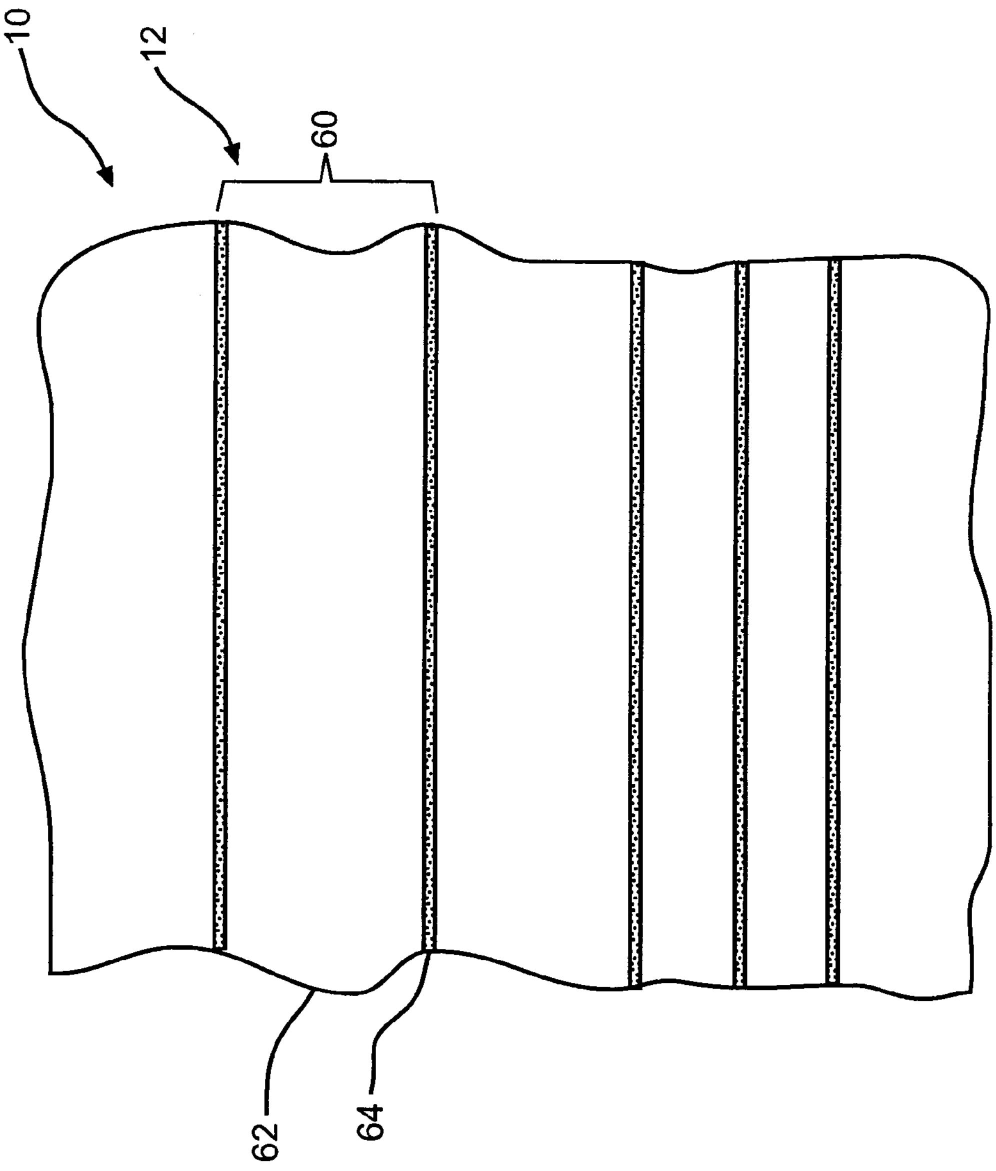
FIG. 6 is an enlarged sectional elevational view of the beam of FIG. 5 showing the composition of individual laminations taken along line 6—6 of FIG. 5.

FIG. 1 illustrates a composite glulam beam, indicated generally at 10, made according to the invention. The beam 10 is made of variable thickness wood laminations 12, where the wide faces 14 of each lamination layer 12 are laminated together to produce the beam. As can be seen in FIGS. 1 and 4, the individual wood laminations 12, 42 have wide faces 14 and a relatively thin thickness when compared to the width of the faces 14. Further, it can be seen that the individual laminations 12, 42 are substantially parallel to each other, and the wide faces 14 are oriented substantially normal to the height of the beam 10. Composite lumber structured in this fashion, referred to as optimized lumber, differs from conventional glulam beams in that the lamination thickness is used as a variable to optimize beam strength, thereby achieving superior properties and performance results. In contrast to conventional glulam beams, this invention can rely on common grades of relatively inexpensive wood laminations reduced to a smaller lamination thickness to achieve the necessary improved bending and strength characteristics when compared with the conventional beams shown in FIG. 2. As illustrated in FIG. 6, a lamination thickness 60 of one of the laminations 12 of the beam 10 consists of a wood layer 62 and a laminate adhesion layer 64. The wood layer 62 has a length, width and thickness. The area of the face 14 is comprised of the length times the width. The bonding of the laminations 12 takes place along the faces of the laminations, with the faces of the laminations bonded to each other, and the loading of the laminations occurs primarily in a direction perpendicular to the faces 14 of the laminations. The wood layer 62 can be comprised of any appropriate type of wood material, such as solid sawn wood, kerf sawn wood, or composite wood layers. Similarly, the laminate adhesion layer 64 can be comprised of any appropriate bonding material, such as phenol-formaldehyde adhesives or emulsion polymer adhesives.

Figure 3:
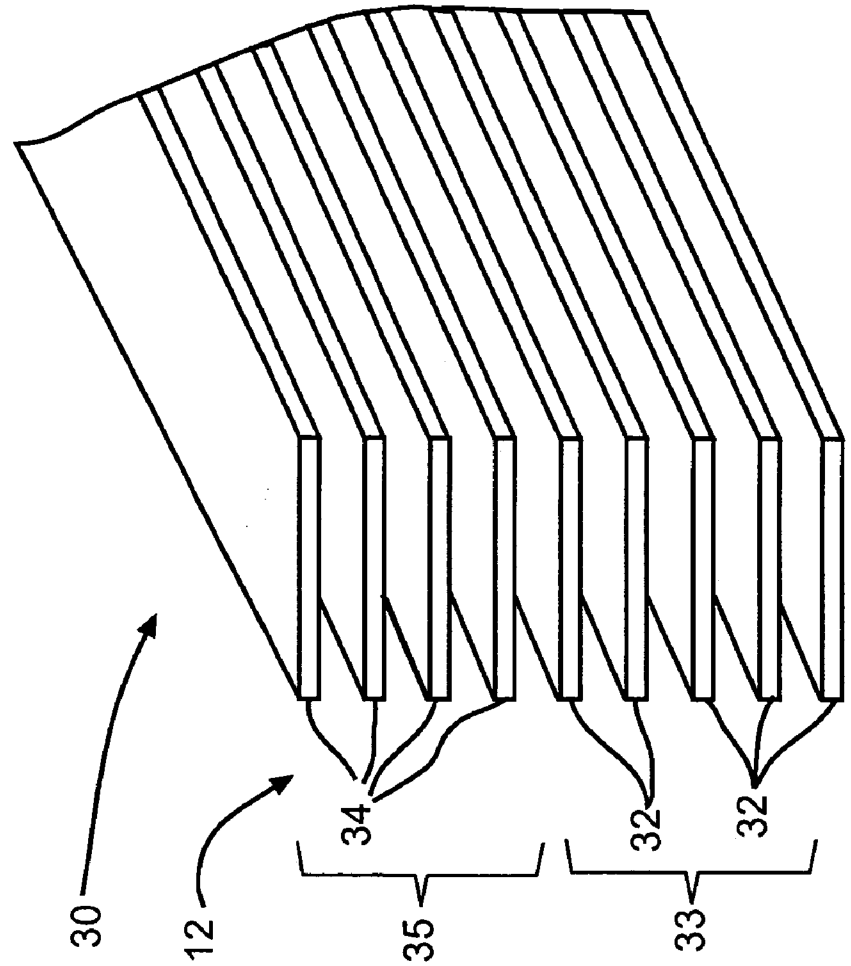
FIG. 3 is an exploded perspective view of a preferred method of assembly for a laminated timber beam in accordance with this invention.

As shown in FIG. 3, the method of the invention involves gathering or arranging a plurality of individual wood laminations 12 in a juxtaposed relationship to form an assembly 30. The adhesive is interposed between each of the wood lamination layers 12, and the assembled laminations are joined together under pressure to bond the layers together and form a laminated beam according to the invention. The assembly 30 includes, in particular, tension zone wood laminations 32 forming a tension zone 33, and remainder zone wood laminations 34 forming a remainder zone 35. The beam 40 has a neutral axis 38. During loading of the beam 40, lamination layers positioned below the neutral axis 38 will experience tensile stress while the portions of the beam positioned above the neutral axis 38 will experience compressive stress. This means that all the lamination layers 32 in the tension zone 33 will experience tensile stress, while laminations 34 in the remainder zone may experience tensile stress, compressive stress, or zero stress (neutral), depending on where the laminations are positioned vertically with respect to the neutral axis 38. The average thickness of the laminations 32 in the tension zone 33 is less than the average thickness of the laminations 34 in the remainder zone 35. Once the assembly 30 of laminations 32 and 34 is brought together, the laminations are passed through a hydraulic laminating press, not shown, which apply pressure and, optionally, heat, to laminate or bond the laminations within the assembly 30 into the completed optimized laminated beam 40, shown in FIG. 5. There are many suppliers of such presses, such as COE Manufacturing, Tigard, Oreg.

Figure 5:
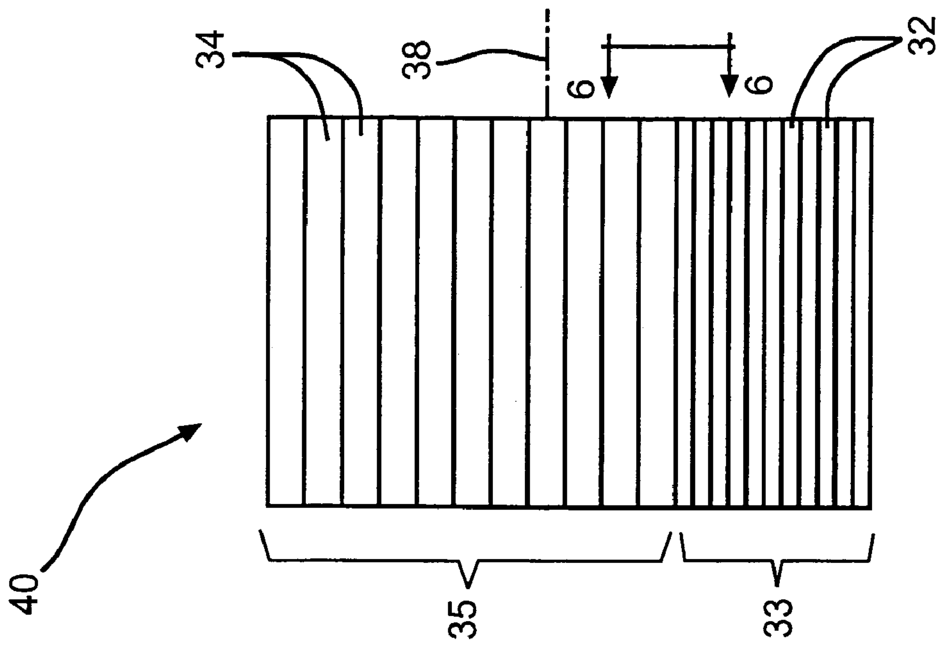
FIG. 5 is a sectional elevational view of a laminated timber beam produced by the process illustrated in FIG. 3.

It can be seen in FIG. 5 that the glulam beam 40 has two thickness variation zones, i.e., tension zone 33 and remainder zone 35, and the neutral axis 38. The average thickness of the lamination layers 32 in the tension zone 33 is less than the average thickness of the lamination layers 34 in the remainder zone 35. The use of laminations 32 of lesser thickness in the tension zone 33 than in the remainder zone 35 results in a greater tensile strength for the beam 40 than would be the case for the prior art beam 20 illustrated in FIG. 2 having laminations of equal thicknesses (assuming the overall thickness of the beam 20 is the same as the overall thickness of the beam 40). Therefore, the method of the invention, using thinner lamination thicknesses in the tension zone 33, provides improved strength on a per-unit-thickness-of-beam basis.

As shown in FIG. 4, a variation of the method of the invention described above involves gathering or arranging a plurality of individual wood laminations 42, in a juxtaposed relationship, in combination with a prelaminated panel 44 made of individual wood layers 46 to form an assembly 50. The prelaminated panel 44 can be a prelaminated assembly of kerf-sawn lumber. It can be seen that the plurality of individual wood laminations 42 can be viewed as forming a remainder zone 52, and the prelaminated panel 44 can be viewed as comprising a tension zone 54. The average thickness of the laminations in the prelaminated panel 44 (or tension zone 54) is less than the average thickness of the laminations 42 in the remainder zone 52. Once the assembly 50 of laminations 42 and the prelaminated panel 44 are brought together, the laminations are passed through a laminating press, not shown, in accordance with the method of assembly of this invention, where all the laminations are bonded together to make the optimized laminated beam similar to that shown in FIG. 5. Such a beam, including the prelaminated panel 44, would have two thickness variation zones, a tension zone similar to tension zone 33 and remainder zone similar to remainder zone 35, with the average thickness of the lamination layers in the tension zone being less than the average thickness of the lamination layers in the remainder zone.

Figure 7:
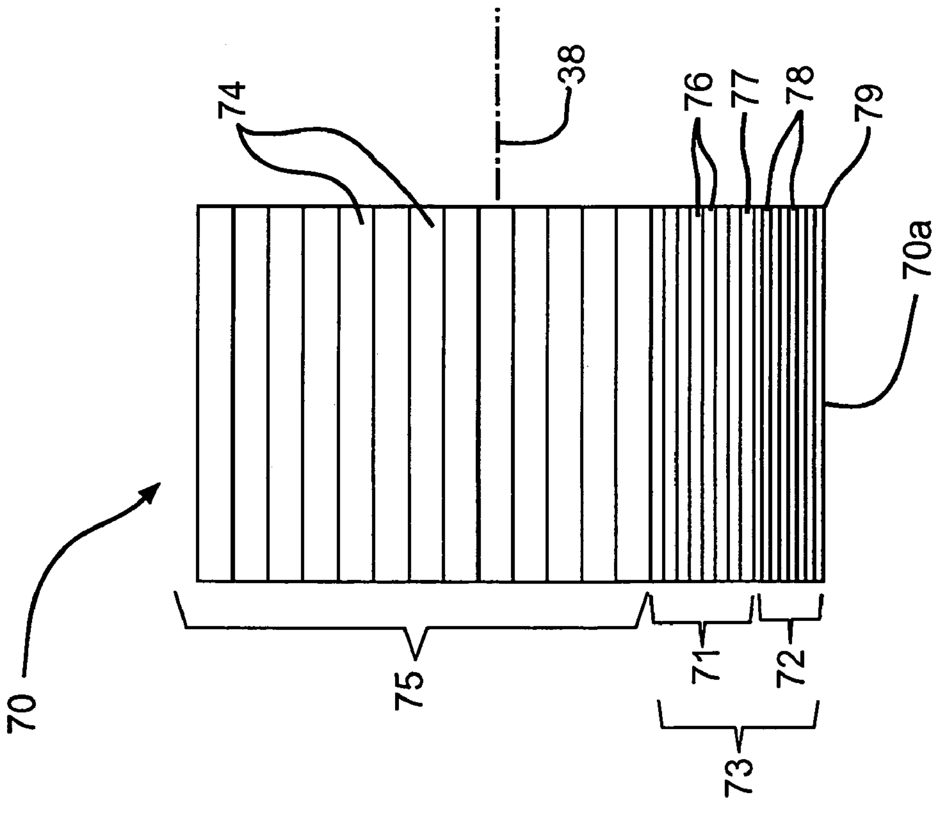
FIG. 7 is a sectional elevational view of a laminated timber beam having three thickness variation zones produced in accordance with the methods of assembly of this invention.

In another embodiment of the invention, as shown in FIG. 7, the method of the invention is used to manufacture a beam 70 having a tension zone 73 and a remainder zone 75. Further, the tension zone 73 is divided into an inner tension zone 71 and an outer tension zone 72. The remainder zone 75 has laminations 74, the inner tension zone 71 has laminations 76, and the outer tension zone 72 has laminations 78. The lowermost or outermost lamination of the laminations 76 in the inner tension zone 71 is lamination 77. The lowermost or outermost lamination of the laminations 78 in the outer tension zone 72 is lamination 79. It can be seen that the laminations 78 in the outer tension zone 72 have an average thickness less than the average thickness of the laminations 76 in the inner tension zone 71. Further, the average thickness of the laminations 76 in the inner tension zone 71 are less than the average thickness of the laminations 74 of the remainder zone 75. The use of thinner average lamination thicknesses in the inner tension zone 71 than the average lamination thickness of the remainder zone 75, coupled with an even thinner average lamination thickness in the outer tension zone 72 than the average lamination thickness of the outer tension zone 7, results in an increased strength for the beam 70. Therefore, the method of the invention, using thinner lamination thicknesses in the inner tension zone 71 and even thinner lamination thicknesses in the outer tension zone 72, provides improved strength on a per-unit thickness basis when compared with the embodiment illustrated in FIG. 5.

Figure 8:
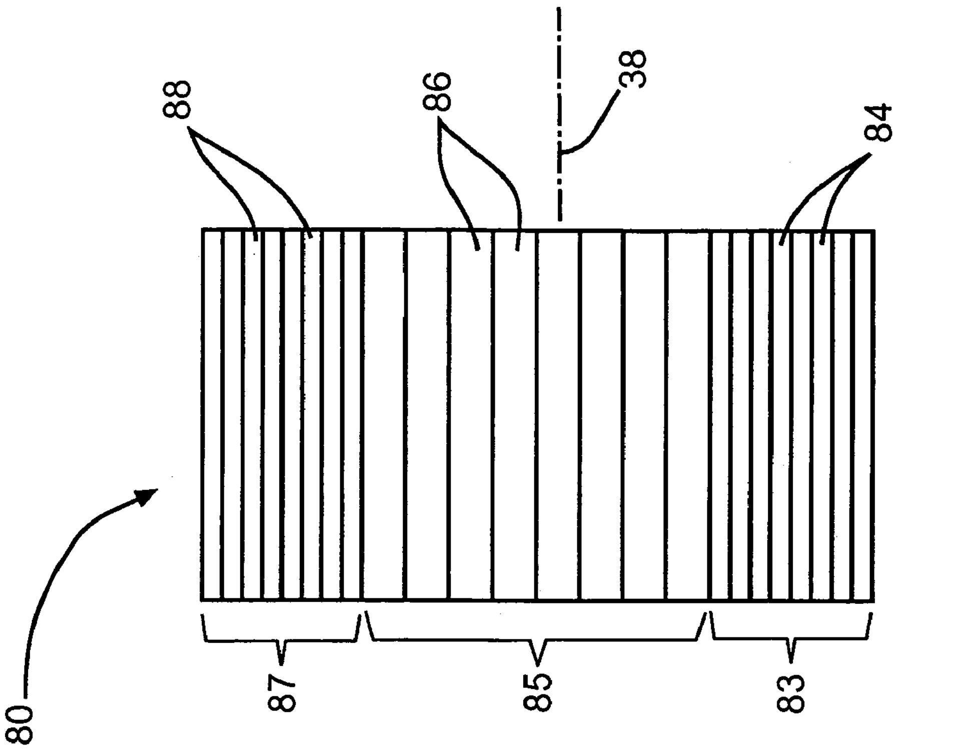
FIG. 8 is a sectional elevational view of another laminated timber beam having three thickness variation zones produced in accordance with the methods of assembly of this invention.

In yet another embodiment of the invention, as shown in FIG. 8, the method of the invention is used to manufacture a beam 80 having a tension zone 83, an upper zone or compression zone 87, and a remainder zone 85. The remainder zone 85 has laminations 86, the tension zone 83 has laminations 84, and the compression zone 87 has laminations 88. The laminations 88 in the compression zone 87, being above the neutral axis 38, all experience compressive stress. The laminations 84 in the tension zone 83, being below the neutral axis, all experience tensile stress. Laminations 86 in the remainder zone may experience tensile stress, compressive stress, or zero stress (neutral), depending on where the laminations are positioned vertically with respect to the neutral axis 38. Since the beam 80 has a defined tension zone 83 and compression zone 87, the remainder zone 85 can be considered to be a core zone. The average thickness of the laminations 84 and 88 of the tension zone 83 and compression zone 87, respectively, is less than the average thickness of the laminations 86 of the core zone 85. This provides improved strength for the beam 80 when compared with a prior art glulam beam 20, where beams of equal overall total thickness are compared.

Figure 9:
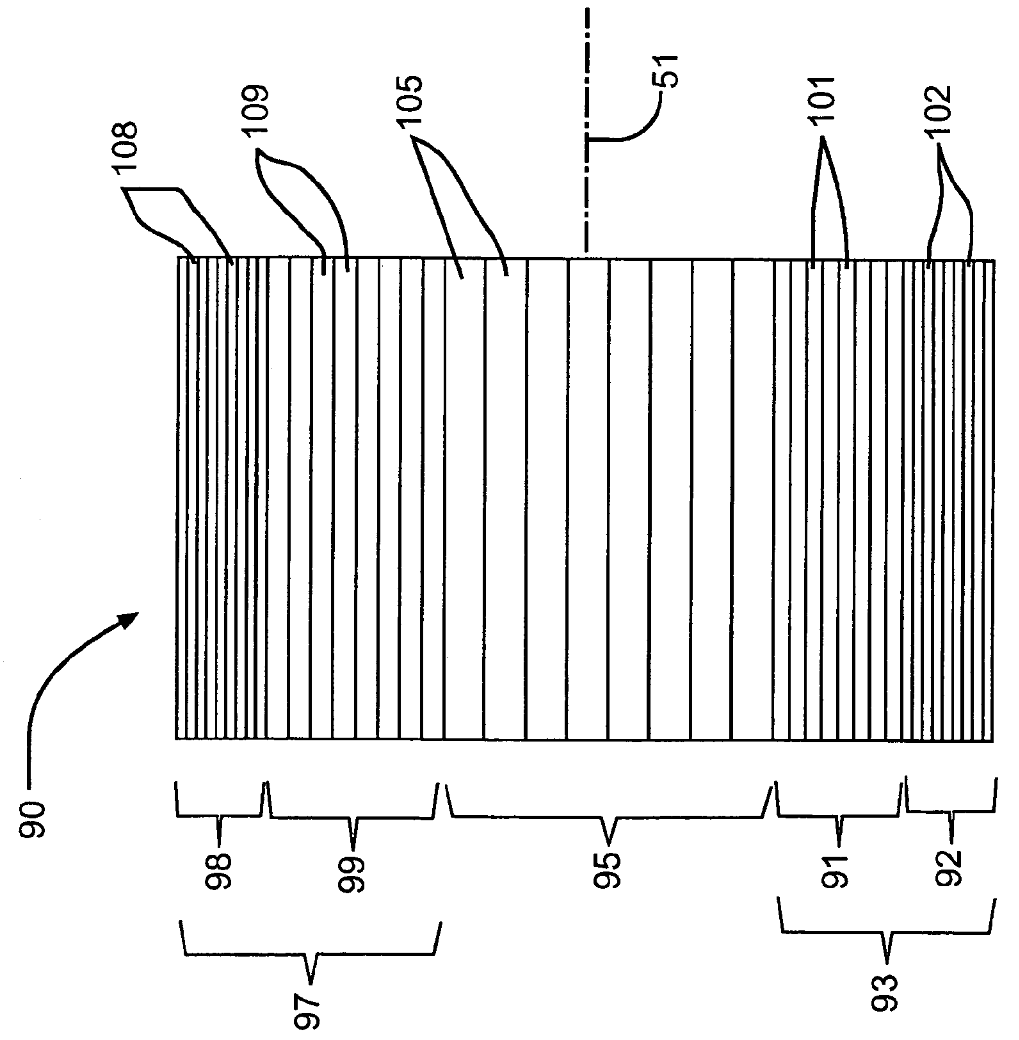
FIG. 9 is a sectional elevational view of yet another laminated timber beam, having five thickness variation zones, produced in accordance with the methods of assembly of this invention.

Another embodiment of the invention is illustrated in FIG. 9, where the beam 90 made by the method of the invention includes a tension zone 93, remainder zone 95 and compression zone 97. The tension zone 93 is comprised of inner tension zone 91 and outer tension 92. The compression zone 97 is comprised of outer compression zone 98 and inner compression zone 99. The remainder zone 95 has laminations 105, the inner tension zone 91 has laminations 101, the outer tension zone 92 has laminations 102, the inner compression zone 99 has laminations 109, and the outer compression zone 98 has laminations 108. It can be seen that the laminations 102 in the outer tension zone 92 have an average thickness less than the average thickness of the laminations 101 in the inner tension zone 91. Further, the average thickness of the laminations 101 in the inner tension zone 91 are less than the average thickness of the laminations 105 of the remainder zone 95. Likewise, it can be seen that the laminations 108 in the outer tension zone 98 have an average thickness less than the average thickness of the laminations 109 in the inner tension zone 99. Further, the average thickness of the laminations 109 in the inner tension zone 99 is less than the average thickness of the laminations 105 of the remainder zone 95.

It can be seen that the average thickness of the laminations, rather than the grade of lamination materials, is varied from zone to zone to achieve increased strength. This use of varying lamination thicknesses allows the same grade of lamination materials to be used in each of the zones while exceeding the performance of a traditional Glulam beam 20. However, it is to be understood that in addition to strengthening the beams using the method of the invention with laminations of varying thicknesses, the grade of lamination materials may be varied such that different zones contain a superior grade of lamination materials with respect to other zones to further enhance the performance of the beams.

In determining the ideal structure for the optimized laminated beam, both the thickness of the individual laminations and the vertical height of the remainder zone relative to the overall vertical beam height are determinative of the overall strength characteristics of the beam. Referring to FIG. 8, the average thickness of the respective laminations of beam 80 is varied such that the average thickness of the individual compression zone laminations 86 is less than the average thickness of the individual core zone laminations 85. Further, the average thickness of the individual compression zone laminations 86 should be preferably no greater than sixty percent of the average thickness of the individual core zone laminations 85. Similarly, the lamination thicknesses of the beam 80 are varied such that the thickness of the individual tension zone laminations 84 is less than the thickness of the individual core zone laminations 85. Once again, the average thickness of the individual tension zone laminations 84 is preferably no greater than sixty percent of the average thickness of the individual core zone laminations 85. The thickness of individual laminations in conventional engineered wood products can be anywhere from 0.1 inches to 1.5 inches, or greater. In a preferred embodiment of the invention, the compression zone laminations 86 and the tension zone laminations 84 have an average individual lamination thickness less than or equal to ¾ inches. Thus, it is preferred that the thickness of both the individual compression zone laminations 86 and the individual tension zone laminations 84 is within the range of from about 0.1 inches to about ¾ inches. Conversely, the individual core zone laminations 85 have an average lamination thickness of at least ¾ inches. A preferred average thickness of the individual core zone laminations 85 is within the range of from about ¾ inches to about 1.5 inches. Additionally, in the preferred embodiment, the total vertical height of the core zone 85 accounts for at least forty percent of the vertical height of the optimized beam 80.

Referring to FIG. 7, the tension zone 73 of the optimized laminated beam 70 is divided into two sections, inner tension zone 71 and outer tension zone 72. All the laminations 76 within the inner tension zone 71 preferably have the same average lamination thickness. Likewise, all the laminations 78 within the outer tension zone 72 preferably have the same average lamination thickness. (It is to be understood that the thickness can also vary within the zones 71 and 72.) The average thickness of the respective laminations 76, 78 is varied between the zones 71, 72 such that the average thickness of the laminations 78 of the outer tension zone 72 is less than the average thickness of the laminations 76 of the inner tension zone 71. Preferably, both the inner tension zone laminations 76 and the outer tension zone laminations 78 have an average individual lamination thickness less than or equal to ¾ inches. Also, preferably, the average thickness of the individual outer zone laminations 78 is no greater than sixty percent of the average thickness of the individual inner zone laminations 76. Therefore, preferably, the outer tension zone laminations 78 will have an average individual lamination thickness less than or equal to about 7⁄16 inches. A preferred range of the average thickness of the individual outer tension zone laminations 78 is within the range of from about 50 percent to about sixty percent of the average thickness of the laminations 76 in the inner tension zone 71. Where the laminations 76 have a thickness of ¾ inches, the average lamination thickness of the outer tension zone laminations is preferably within the range of from about ⅜ inches to about 7⁄16 inches. However, the average thickness of the individual outer zone laminations 78 may be set to any value within the specified acceptable limits for engineered wood products, such as, for example, within the range of from about 0.1 inches to about 1.5 inches. Preferably the dimension selected complies with the parameters set forth for defining an appropriate optimized laminated beam structure. Finally, the total vertical height of the remainder zone 75 accounts for at least forty percent of the vertical height of the beam 70. It can be seen that the thinner laminations 78 are used at or near the outer surface 70*a* of the optimized laminated beam 70, which is where the tensile stresses are the highest.

For beam lay-ups that divide the tension zone 73 of the optimized laminated beam 70 into multiple tensile stress zones 71 and 72, as illustrated in FIG. 7, it is possible to calculate a preferred lamination thickness for the individual laminations 76 in both the inner tension zone 71 and the outer tension zone 72 to optimize both the beam strength and resource utilization. The relationship of the lamination thickness preferred for the laminations 76 of the inner tension zone 71 and the laminations 78 of the outer tension zone 72 can be calculated according to the following formula:

$$\sqrt{\frac{t(i)}{t(j)}} = \left[\frac{y(j)}{y(i)}\right]\left[\frac{F_t(i)}{F_t(j)}\right]$$

where:

- i=the lowermost lamination 79 within the outer tension zone 72 that is farthest from the neutral axis 38 of the beam 70.
- y(i)=the distance from the neutral axis of the beam to lamination i.
- t(i)=the thickness of the lamination i.
- j=the lowermost lamination 77 within the inner tension zone 71 that is farthest away from the neutral axis 38 of the beam 70.
- y(j)=the distance from the neutral axis of the beam to lamination j.
- t(j)=the thickness of the lamination j.
- $F_t$(i), $F_t$(j)=the tensile strengths (stresses) of laminations measured at the same thickness, typically 1.5 inches.

The calculation is based on the principle that the relative thickness of the laminations in the inner tension zone 71 and the outer tension zone 72 is such that the square root of the ratio of the lamination thicknesses is approximately both inversely proportional to the ratio of the distances from the outer ends of the two tension zones 71, 72 to the neutral axis 38 of the beam 70, and directly proportional to the ratio of the allowable tensile stress of the individual laminations in the two tension zones, calculated using the same lamination thickness. Using this principle, it can be seen that thinner laminations are placed near the outside of the optimized laminated beam 70, with the result being an overall improvement in the bending strength of the optimized laminated beam 70. The calculation is based on the stress distribution in the beam, the thickness of the laminations 76, 78, and the distance from the neutral axis 38.

While the three zones have been shown in the embodiments illustrated in FIGS. 7 and 8, and while five zones have been shown in the embodiments illustrated in FIG. 9, it is to be understood that any number of compression zones and any number of tension zones with varying lamination thickness can be used according to the method of the present invention. Further, the invention includes the optimized laminated beams made according to the method of the invention. Also, in a preferred embodiment of the invention, the laminations are comprised of solid-sawn, end-jointed laminations.

Laboratory testing and numerical modeling have demonstrated that using lamination thickness as a tool to optimize the beam strength results in bending strength properties that both meet and often significantly exceed conventional Glulam strength values. Using the optimized laminated beam variable lamination thickness structure made according to the method of the invention, bending stresses in the range of 3000–4000 psi have been consistently achieved in the laboratory without using the high-grade, costly tension laminations required by the prior art.

EXAMPLE 1

A Metriguard dynamic E-tester was used to determine lamination modulus of elasticity (MOE) values of a large number of samples of laminations of the type that could be used in optimized laminated beams made according to the invention. The samples had a width within the range of from about 3 inches to about 12 inches, a span to depth ratio of about 1/100, and a length within the range of from about 8 feet to about 16 feet. The testing results are shown in Table 1. The coefficient of variation (COV) of the laminations was also tested. The protected $5^{th}$ percentile was calculated, and the moisture content (MC) was measured.

TABLE 1

Lamination MOE Values

| Lamination Grade | Grading Criteria | Thickness (in) | Sample Size | Mean MOE ($10^6$ psi) | COV | Protected $5^{th}$ % | MC (%) |
|---|---|---|---|---|---|---|---|
| 2 | Any | 15/16" | 7560 | 1.77 | 0.191 | NA | 8.92 |
| 3 | 1.48 | 15/16" | 2667 | 1.90 | 0.156 | 1.48 | 8.63 |
| $6_1$ | 1.68–1.96 | 15/16" | 933 | 1.83 | 0.046 | 1.68 | 9.25 |
| $6_2$ | 1.97–2.20 | 15/16" | 847 | 2.07 | 0.033 | 1.97 | 9.25 |
| $6_3$ | 2.21 | 15/16" | 1137 | 2.48 | 0.238 | 2.21 | — |

EXAMPLE 2

Tension testing of a number of the laminations with varying thicknesses was also conducted according to ASTM D198-99, sections 28 through 35, for all grades of lamination stock. Tension strength of the laminations was tested using finger-jointed material. The lamination width was within the range of from about 3¼ inches to about 5¾ inches, and the gage length was about 60 inches. The lamination test matrix is given in Table 2 A and the lamination tension test results are given in Table 2 B.

TABLE 2A

Lamination Tension Test Matrix

| Test | Grade | Thickness (in) | Width (in) | Gage Length (in) |
|---|---|---|---|---|
| Tension | #6 - Outer Tension | 0.938 | 3.25–5.75 | 60 |
| Tension | #3 - Inner Tension | 0.938 | 3.25–5.75 | 60 |
| Tension | #2 - Remainder | 0.938 | 3.25–5.75 | 60 |

TABLE 2B

Lamination Tension Strength Properties

| Lamination Grade | Protected $5^{th}$ % | Thickness (in) | Sample Size | Mean $F_t$ (psi) | COV | Actual $5^{th}$ % | MC (%) |
|---|---|---|---|---|---|---|---|
| #2 | 1200 psi | 15/16" | 175 | 4271 | 0.384 | 1735 psi | 7.79 |
| #3 | 3200 psi | 15/16" | 196 | 5679 | 0.288 | 3211 psi | 7.90 |
| #6 | 3400 psi | 15/16" | 158 | 7232 | 0.273 | 3818 psi | 7.62 |

EXAMPLE 3

Over 200 full sized optimized laminated beams were made according to the method of the invention, including different sizes and lay-ups, using the laminations of the type disclosed above in Examples 1 and 2. The lamination thickness was varied according to the formula above, resulting in thinner lamination thickness near the outer fibers of the beam. These beams were tested according to ASTM D5456-02, the performance-based standard for structural composite lumber (SCL). Table 3 shows the beam test matrix used for verifying design values for optimized laminated beams made according to the method of the invention. The modulus of elasticity (MOE) and fiber stress bending ($F_b$) of the beams were tested.

TABLE 3

Optimized Laminated Beam - Laboratory Bending Test Matrix

| Test | Grade | Beam Size | Sample Size (number of beams) |
|---|---|---|---|
| Bending | 32F1.8E | 3" × 6" × 126" | 53 |
| | 36F2.0E | 3" × 6" × 126" | 53 |
| | 40F2.2E | 3" × 6" × 126" | 53 |
| | 40F2.2E | 4.75" × 12" × 252" | 53 |

EXAMPLE 4

Flexural properties, modulus of elasticity MOE and fiber stress bending $F_b$, of all of the full sized beams made in Example 3 above were tested in accordance with ASTM D5456-02, specifically section 5.5.1. A 53-piece sample size was used and the test setup was in accordance with the ASTM D198 4-point loading configuration. Unadjusted design values are based on non-parametric analysis for modulus of rupture (MOR), i.e., failure of the beam, and average values for MOE. A span to depth ratio of 21:1 was consistent for all beam sets. Beams were subjected to loading rates of 4 inches per minute and 6 inches per minute for 6-inch and 12-inch beams respectively. The lower tolerance limit (LTL) was then calculated. The optimized laminated beam test results are given in Table 4.

TABLE 4

Optimized Laminated Beam Flexure Test Results

| Grade Designation | Depth (in) | Width (in) | Span (in) | Mean MOR (psi) | σ(psi) | COV | Allowable Bending Stress $F_b$ = 5th LTL/2.1 (psi) |
|---|---|---|---|---|---|---|---|
| 32F1.8E | 6 | 3 | 126 | 10115 | 1585 | 0.1567 | 3410 |
| 36F2.0E | 6 | 3 | 126 | 11157 | 1517 | 0.1360 | 4023 |
| 40F2.2E | 6 | 3 | 126 | 10773 | 1517 | 0.1408 | 3988 |
| 40F2.2E | 12 | 4.75 | 252 | 9553 | 1077 | 0.1127 | 3692 |

The last column shows the range of allowable bending stresses $F_b$ of 3,410–4,023 psi that were achieved using the various optimized laminated beam lay-ups. These figures provide a rough design value for the beams, and these values significantly exceed conventional glulam values, which typically do not exceed 3,000 psi.

The principle and mode of operation of this invention have been described in its preferred embodiments. However, it should be noted that this invention can be practiced otherwise than as specifically illustrated and described without departing from its scope.

What is claimed is:

1. The method of forming a laminated beam comprising:

assembling a plurality of individual wood laminations in a juxtaposed relationship, wherein the individual wood laminations comprise a single piece of wood and have wide faces and a relatively thin thickness when compared to the width of the faces; and joining the assembled laminations together to form a laminated beam with the faces of the laminations bonded to each other;

wherein the assembled laminations define a tension zone of individual wood laminations and a remainder zone of individual wood laminations; and wherein the assembled laminations in the tension zone comprise an inner tension zone having a plurality of laminations with an average uniform thickness and an outer tension zone adjacent the inner tension zone, the outer tension zone having a plurality of laminations with an average uniform thickness, and wherein the average thickness of the laminations in the outer tension zone is less than the average thickness of the laminations in the inner tension zone, wherein the average thickness of the laminations in the inner tension zone is less than the average thickness of the laminations in the remainder zone, and wherein the laminations in the outer tension zone, the inner tension zone, and the remainder zone are comprised of the same grade of lamination materials.

2. The method of claim 1 wherein the average thickness of the laminations in the outer tension zone is no greater than sixty percent of the average thickness of the laminations in the inner tension zone.

3. The method of claim 1 wherein the laminations are comprised of solid-sawn, end-jointed wood laminations.

4. The method of forming a laminated beam comprising:

assembling a plurality of individual wood laminations in a juxtaposed relationship, wherein the individual wood laminations comprise a single piece of wood and have wide faces and a relatively thin thickness when compared to the width of the faces; and joining the assembled laminations together to form a laminated beam with the faces of the laminations bonded to each other;

wherein the assembled laminations define a tension zone of individual wood laminations and a remainder zone of individual wood laminations, and wherein the assembled laminations in the tension zone are comprised of an inner tension zone having a plurality of laminations with an average uniform thickness and an outer tension zone adjacent the inner tension zone, the outer tension zone having a plurality of laminations with an average uniform thickness, wherein the average thickness of the laminations in the outer tension zone is less than the average thickness of the laminations in the inner tension zone, and wherein the laminations in the outer tension zone, the inner tension zone, and the remainder zone are comprised of the same grade of lamination materials; and wherein the average thickness of the laminations in the inner tension zone and outer tension zone is determined by:

calculating a thickness ratio of the lamination thickness of the individual laminations in the inner tension zone to the lamination thickness of the individual laminations in the outer tension zone;

determining the square root of the thickness ratio;

calculating a distance ratio of the distance from an outer end of the inner tension zone to a neutral axis of the laminated beam and an outer end of the outer tension zone to a neutral axis of the laminated beam;

adjusting the individual lamination thickness of the laminations in the inner tension zone and the individual lamination thickness of the laminations in the outer tension zone such that the square root of the thickness ratio is inversely proportional to the distance ratio;

calculating a stress ratio of an allowable tensile stress of the individual laminations of the inner tension zone and an allowable tensile stress of the individual laminations of the outer tension zone, wherein the same lamination thickness is used in determining the allowable tensile stress in the inner tension zone and the outer tension zone; and adjusting the individual lamination thickness of the laminations in the inner tension zone and the individual lamination thickness of the laminations in the outer tension zone such that the square root of the tension ratio is approximately directly proportional to the stress ratio.

5. The method of forming a laminated beam comprising:

assembling a plurality of individual wood laminations in a juxtaposed relationship, wherein the individual wood laminations comprise a single piece of wood and have wide faces and a relatively thin thickness when compared to the width of the faces; and joining the assembled laminations together to form a laminated beam with the faces of the laminations bonded to each other;

wherein the assembled laminations define a tension zone of individual wood laminations, a core zone of individual wood laminations, and an compression zone of individual wood laminations; and wherein the average thickness of the laminations in the tension zone is less than the average thickness of the laminations in the core zone, and wherein the average thickness of the laminations in the compression zone is less than the average thickness of the laminations in the core zone; and wherein the assembled laminations in the tension zone comprise an inner tension zone having a plurality of laminations with an average uniform thickness and an outer tension zone adjacent the inner tension zone, the outer tension zone having a plurality of laminations with an average uniform thickness, wherein the average thickness of the laminations in the outer tension zone is less than the average thickness of the laminations in the inner tension zone, and wherein the laminations in the compression zone, the core zone, and the tension zone are comprised of the same grade of lamination materials.

6. The method of claim 5 wherein the core zone laminations account for at least forty percent of the vertical height of the laminated beam and wherein substantially all of the core zone laminations have a thickness of at least ¾ inches.

7. The method of claim 5 wherein substantially all of the compression zone laminations and substantially all of the tension zone laminations have a thickness less than about ¾ inches.

8. The method of claim 5 wherein the laminations are comprised of kerf-sawn, end-jointed wood laminations.

9. The method of forming a laminated beam comprising:

assembling a plurality of individual wood laminations in a juxtaposed relationship, wherein the individual wood laminations comprise a single piece of wood and have wide faces and a relatively thin thickness when compared to the width of the faces; and joining the assembled laminations together to form a laminated beam with the faces of the laminations bonded to each other;

wherein the assembled laminations define a tension zone of individual wood laminations, a core zone of individual wood laminations, and a compression zone of individual wood laminations; and wherein the average thickness of the laminations in the tension zone is less than the average thickness of the laminations in the core zone, and wherein the average thickness of the laminations in the compression zone is less than the average thickness of the laminations in the core zone; and wherein the assembled laminations in the compression zone comprise an outer compression zone having a plurality of laminations with an average uniform thickness and an inner compression zone adjacent the outer compression zone, the inner compression zone having a plurality of laminations with an average uniform thickness, wherein the average thickness of the laminations in the outer compression zone is less than the average thickness of the laminations in the inner compression zone, and wherein the laminations in the compression zone, the core zone, and the tension zone are comprised of the same grade of lamination materials.

10. The method of claim 9 wherein the core zone laminations account for at least forty percent of the vertical height of the laminated beam and wherein substantially all of the core zone laminations have a thickness of at least ¾ inches.

11. The method of claim 9 wherein substantially all of the compression zone laminations and substantially all of the tension zone laminations have a thickness less than about ¾ inches.

12. The method of claim 9 wherein the laminations are comprised of kerf-sawn, end-jointed wood laminations.

13. The method of claim 1 wherein the single piece of wood comprises a single continuous layer of a composite wood product.

14. The method of claim 1 wherein the single layer of wood comprises a single continuous layer of a composite wood product.

15. The method of claim 4 wherein the single piece of wood comprises a single continuous layer of a composite wood product.

16. The method of claim 4 wherein the single layer of wood comprises a single continuous layer of a composite wood product.

17. The method of claim 5 wherein the single piece of wood comprises a single continuous layer of a composite wood product.

18. The method of claim 5 wherein the single layer of wood comprises a single continuous layer of a composite wood product.

19. The method of claim 9 wherein the single piece of wood comprises a single continuous layer of a composite wood product.

20. The method of claim 9 wherein the single layer of wood comprises a single continuous layer of a composite wood product.

21. The method of forming a laminated beam comprising:

assembling a plurality of individual wood laminations in a juxtaposed relationship, wherein the individual wood laminations comprise a single layer of end-jointed wood pieces and have wide faces and a relatively thin thickness when compared to the width of the faces; and joining the assembled laminations together to form a laminated beam with the faces of the laminations bonded to each other;

wherein the assembled laminations define a tension zone of individual wood laminations and a remainder zone of individual wood laminations; and wherein the assembled laminations in the tension zone comprise an inner tension zone having a plurality of laminations with an average uniform thickness and an outer tension zone adjacent the inner tension zone, the outer tension zone having a plurality of laminations with an average uniform thickness, and wherein the average thickness of the laminations in the outer tension zone is less than the average thickness of the laminations in the inner tension zone, wherein the average thickness of the laminations in the inner tension zone is less than the average thickness of the laminations in the remainder zone, and wherein the laminations in the outer tension zone, the inner tension zone, and the remainder zone are comprised of the same grade of lamination materials.

* * * * *